Feb. 19, 1929. 1,702,570
C. F. POOLE
APPARATUS FOR HANDLING LOOSE MATERIALS
Filed Dec. 25, 1926   3 Sheets-Sheet 1

Inventor
Clarence F. Poole

Feb. 19, 1929.

C. F. POOLE 1,702,570

APPARATUS FOR HANDLING LOOSE MATERIALS

Filed Dec. 25, 1926

Inventor
Clarence F. Poole

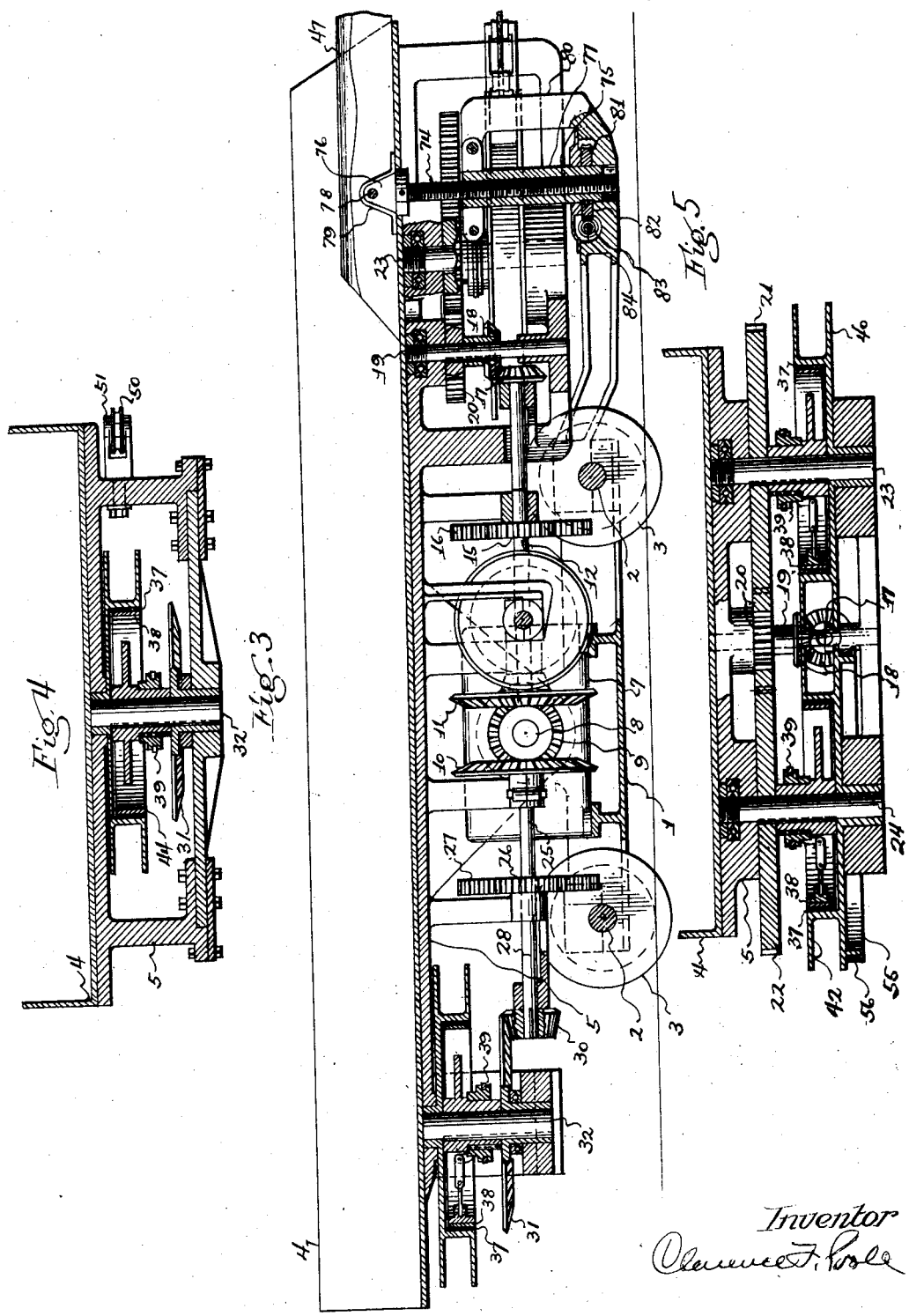

Patented Feb. 19, 1929.

1,702,570

UNITED STATES PATENT OFFICE.

CLARENCE F. POOLE, OF CHICAGO, ILLINOIS, ASSIGNOR TO GOODMAN MANUFACTURING COMPANY, OF CHICAGO, ILLINOIS, A CORPORATION OF ILLINOIS.

APPARATUS FOR HANDLING LOOSE MATERIALS.

Application filed December 25, 1926. Serial No. 157,009.

This invention relates to improvements in apparatus for handling loose materials, of the class having a draft operated scraper and a portable power mechanism therefor, having an inclined loading chute or guide for the scraper extending longitudinally thereover. My invention has among other objects to improve upon the mechanism for actuating the scraper and especially its arrangement with respect to the loading chute, whereby the device is adapted for use under low roof conditions in mines.

The present application utilizes certain general features disclosed in an application filed by Charles E. Davis, Serial Number 352,413, filed January 19, 1920, and a companion application Serial Number 120,618, filed by Thomas E. Pray, July 6, 1926, but relates particularly to and provides improvements in construction of the portable power device and loading chute, whereby the driving motor is permanently supported on the main truck frame, while the guide chute and draft operating devices are pivotally mounted thereon so as to require minimum height, head space or overhead clearance when being transported from place to place in a mine.

My invention may be best understood by reference to the accompanying drawings, wherein;

Figure 3 is a sectional view of the device taken on line 3—3 of Figure 1;

Figure 4 is a sectional view taken on line 4—4 of Figure 1; and

Figure 5 is a sectional view taken on line 5—5 of Figure 1.

Figure 1:
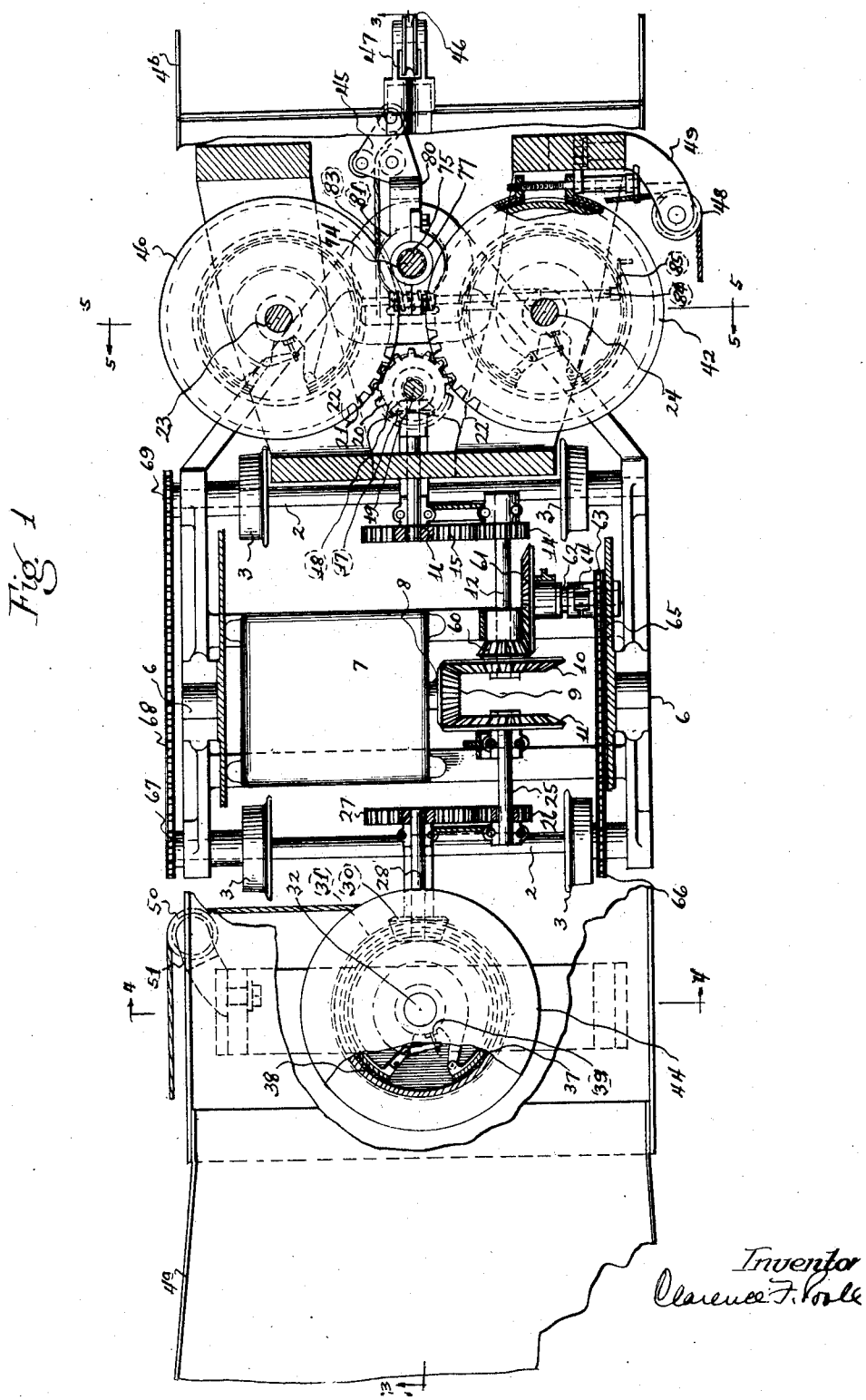
Figure 1 is a fragmentary plan view of the device embodying my invention, with parts of the overhead guide chute broken away to show details of construction of said device.
Figure 2:
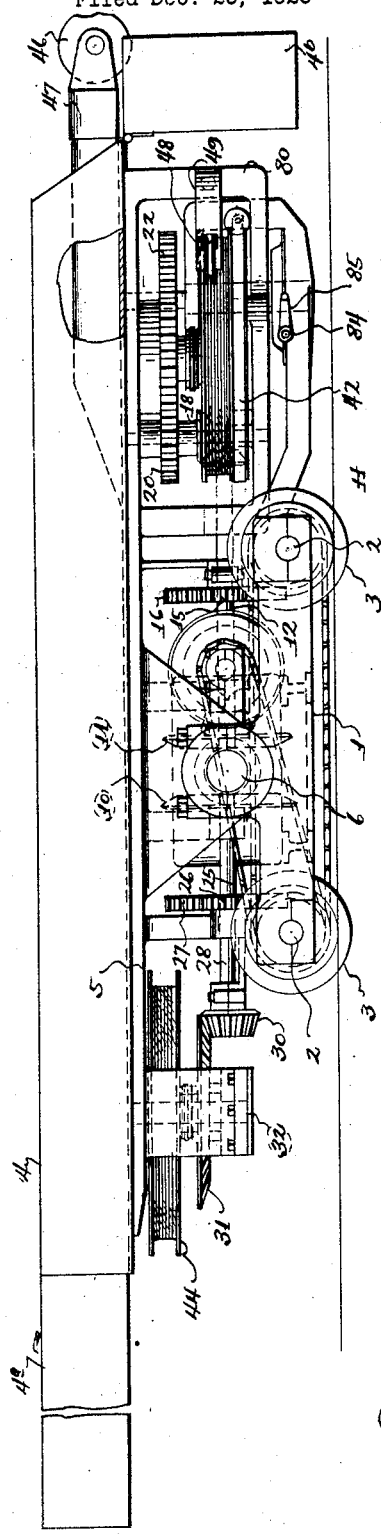
Figure 2 is a side elevation of the device shown in Figure 1.

Referring now to the details of the embodiment of my invention shown in the drawings, it will be seen that I have provided three rope drums, two drums carrying rope for reciprocably moving a scraper, and the third drum carrying a rope for controlling and changing the course of the scrapers path at will in the usual manner. This scraper may be of any well known form, as for instance of the V type, open-bottom construction used with scraping devices of this character. The rope drums are carried on a portable controlling mechanism consisting of a truck frame 1 provided with a pair of longitudinally spaced axles 2, 2, having supporting wheels 3, 3, thereon, adaptable to be run on suitable tracks.

The truck forming the subject matter of the present invention, is provided with a guide chute 4 extending longitudinally over the top thereof and attached to a rocking frame 5 which is pivoted on a transverse axis near the midpoint of said chute by trunnions 6, 6, on each side of the truck frame 1. The winding drums, together with the drive gearing for said drums, are carried on the rocking frame 5 beneath the guide chute and thus rock with said chute. The driving motor to actuate said winding drums is mounted on the stationary truck frame 1 and drives said winding drums in all positions of the guide chute.

The motor shown herein is an electric motor 7 which is fixed on the truck frame 1 in such a position that the axis of rotation of its armature is the same as the pivotal axis of the rocking frame 5. A bevel pinion 9 is fixed to one end of a motor shaft 8 of the motor 7. Said bevel pinion is meshed with bevel gears 10 and 11 on opposite sides thereof, whose centers of rotation are in the same plane as the center of rotation of the pinion 9. These bevel gears are keyed to suitable shafts and actuate the rope drums in all positions of the guide chute through a suitable system of gearing, since the axes of rotation of these several gears are always in the same plane as the axis of rotation of the bevel pinion 9, which includes the pivotal axis of the rocking frame 5. The bevel gear 10 is fixed to the forward end of a longitudinal shaft 12 and rotates a spur pinion 14 through said shaft at the rearward end thereof. The spur pinion 14 meshes with and drives a spur gear 15 fixed to a horizontal shaft 16. A bevel pinion 17 is keyed to the rearward end of the shaft 16 and drives another bevel pinion 18 on the lower end of a vertical shaft 19. A spur gear 20 is keyed to the upper end of said shaft and simultaneously drives spur gears 21 and 22 respectively located on opposite sides of the rocking frame 5 near the rearward end thereof. A winding drum is freely mounted on each of the last mentioned shafts and suitable means are provided whereby said winding drums may be selectively driven by said shafts. The bevel gear 11 is keyed to the rearward end of a shaft 25 and rotates a spur pinion 26 at the forward end thereof. The spur pinion 25 drives a spur gear 27 keyed to a longitudinal shaft 28. A bevel pinion 30 is keyed to the forward end of said shaft and drives a bevel gear 31 keyed to a vertical shaft 32. A winding drum is freely mounted on the shaft 32 and suitable means are provided whereby said drum may be selectively driven by said shaft.

The means for connecting or disconnecting the winding drums to their respective shafts shown herein comprises a suitable friction clutch of the expanding type, such as is commonly used in other devices of this class. Said clutches are of the same construction for each drum so a description of one clutch for one drum only will be given. An inner periphery 37 of the winding drum serves as one face for the clutch while the other face consists of an internal expanding friction or brake band 38. The drum revolves with the shaft when the friction band bears on the inner periphery of the drum and vice versa. A sliding collar 39 having a suitable arrangement of control levers may be provided for said clutch.

Of the three rope drums hereinbefore mentioned, the right rear drum 40 preferably carries the head rope, the left rear drum 42 carries the control rope, and the forward drum 44 carries the tail rope. The head rope pays off drum 40 through guide rollers 45 rearward to a sheave 46 on an extensible loading boom 47, around said sheave and forward over the loading chute 4 to the forward end of the scraper (not shown). The control rope pays off drum 42 to a sheave 48 on the side of the rocking chute adjacent the drum 42 and forward around said sheave to a movable sheave (not shown) which controls the turning of the scraper in the well known manner. It may here be noted that the sheave 48 is mounted on a bracket 49 which is pivotally mounted on the rocking frame 5. This allows said sheave to maintain the proper alignment between the rope drum and the ground in all positions of the loading chute. The tail rope pays off the drum 44 to the side of the loading chute opposite the side off of which the control rope pays, around a sheave 50 mounted on a pivotal bracket 51, and thence forwardly to the rearward end of the scraper (not shown).

Suitable means are provided for holding the control rope drum 42 against rotation. In the construction shown I provide a friction brake for that purpose, including a brake wheel 55 integral with the winding drum 42, having a brake band 56 engageable thereon. One end of this brake band bears against a fixed point 57, the other end is threaded to a screw 58 which is controlled by a suitable hand wheel.

The truck is propelled along the mine tracks by the motor 7 through a suitable system of gearing, which herein comprises a bevel pinion 9, bevel gear 10 and shaft 12, which has a bevel pinion 60 keyed thereon. A bevel gear 61 is driven by the bevel pinion 60 and is mounted on a transverse shaft 62 which is journaled in suitable bearing members on the rocking frame 5. A sprocket 63 is loosely mounted on the shaft 62 and is selectively driven by the bevel gear 61 by a jaw clutch 64 operated by any suitable system of levers (not shown). The sprocket 63 is operatively connected with the forward axle 2 and drive wheels 3 by a drive chain 65 and a driven sprocket 66. The forward and rear wheels are operatively connected together by a sprocket 67 drive chain 68 and sprocket 69 on the rear axle.

It will here be seen that the pivotal mounting of the rocking frame 5 on the truck frame 1 allows the guide chute to be adjusted to the different car heights encountered when loading and allows the guide chute to be brought to a horizontal position when moving. The position of the guide or loading chute is adjusted by a screw device 74, which controls the rocking of the frame 5. Said screw device comprises a vertical screw 75 having a cap piece 76 fixed to its upper end and fitting in the threaded sleeve 77. The cap piece 76 is pivoted at its upper end to a socket 78 on the guide chute by a pivot pin 79. The sleeve 77 is mounted for rotation in a stationary arm 80 integral with and extending rearwardly from the truck frame 1. A worm gear 81 is keyed to the sleeve 77 near its lower end to rotate said sleeve. A housing 82 encloses the worm gear 81 and prevents vertical movement of the worm gear 81 and the sleeve 77. A worm 83 is keyed to a shaft 84 journaled in the arm 80 and meshes with and rotates the worm gear 81 when rotated by the shaft 84 which in turn is rotated by a hand crank 85. Rotation of the crank 85 in one direction causes rotation of the sleeve 77 which raises the screw 75 and rocks the frame 5 on the pins 6—6, thus raising the rear of the guide chute and vice-versa. It will be seen that the socket 78 is pivotally connected to the screw 75 beneath the extension arm 47 and thus does not interfere with the movement of the scraper as it is drawn up along the guide chute.

When the device is being transported the guide chute 4 is preferably brought to a substantially horizontal position by rotation of the crank 85. A forward end $4^a$ of the chute is slid back on the main chute. A rearward end $4^b$ of the chute is folded down on the body and the extension arm 47 is moved out of the way. This decreases both the length and height of the power device for traveling and makes it possible to easily negotiate sharp curves and travel in low coal without removing the props, brushing top or bottom or cutting away the sides of the mine entry.

When the device is loading coal, the guide chute 4 is brought to an inclined position. The rearward end 4ᵇ of the chute is swung upwardly, and the chute is adjusted so the rearward end of the chute just clears the mine car or receptacle into which the material is to be loaded. The forward end 4ᵃ of the chute is placed in position so it bridges the front end of the chute and the ground, and forms a runway so the scraper may run up the chute with its load and discharge said load into a mine car or receptacle.

Although I have shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated in the drawings, excepting as it may be limited by the appended claims.

I claim as my invention:

1. In a device for handling loose material, a frame with supporting wheels therefor, a motor on said frame between said wheels having a drive shaft connected therewith and extending transversely of said frame, a loading chute extending over said frame and having a rocking bearing on said frame coaxial with said drive shaft, winding drums carried by said chute, and means affording operative connection between said drive shaft and said winding drums in several positions of said chute.

2. In a device for handling loose material, a frame with supporting wheels therefor, a motor on said frame between said wheels having a drive shaft connected therewith and extending transversely of said frame, a loading chute extending over said frame, and means whereby said loading chute may be moved in a horizontal position for transportation about a mine, or in an inclined position for loading about an axis coaxial with said drive shaft, winding drums carried beneath said chute, and means affording operative connection between said drive shaft and said winding drums in said horizontal position or said several inclined positions of said chute.

Signed at Chicago, in the county of Cook and State of Illinois, this 23rd day of December, A. D. 1926.

CLARENCE F. POOLE.